United States Patent
Rose et al.

(10) Patent No.: US 10,061,712 B2
(45) Date of Patent: Aug. 28, 2018

(54) VIRTUAL MEMORY PAGE MAPPING OVERLAYS

(71) Applicant: Oracle International Corporation, Redwood City, CA (US)

(72) Inventors: John R. Rose, San Jose, CA (US); Patrick McGehearty, Redwood City, CA (US)

(73) Assignee: Oracle International Corporation, Redwood City, CA (US)

( * ) Notice: Subject to any disclaimer, the term of this patent is extended or adjusted under 35 U.S.C. 154(b) by 4 days.

(21) Appl. No.: 15/151,462

(22) Filed: May 10, 2016

(65) Prior Publication Data
US 2017/0329718 A1    Nov. 16, 2017

(51) Int. Cl.
| | | |
|---|---|---|
| G06F 12/00 | (2006.01) |
| G06F 13/00 | (2006.01) |
| G06F 13/28 | (2006.01) |
| G06F 12/1027 | (2016.01) |
| G06F 3/06 | (2006.01) |

(52) U.S. Cl.
CPC ........ *G06F 12/1027* (2013.01); *G06F 3/0619* (2013.01); *G06F 3/0659* (2013.01); *G06F 3/0673* (2013.01); *G06F 2212/50* (2013.01); *G06F 2212/68* (2013.01); *G06F 2212/682* (2013.01)

(58) Field of Classification Search
CPC ............. G06F 12/1027; G06F 2212/50; G06F 2212/68
USPC ........................................................ 711/156
See application file for complete search history.

(56) References Cited

U.S. PATENT DOCUMENTS

| | | |
|---|---|---|
| 5,133,058 A | 7/1992 | Jensen |
| 5,375,214 A | 12/1994 | Mirza et al. |
| 5,526,504 A | 6/1996 | Hsu et al. |
| 5,765,209 A | 6/1998 | Yetter |
| 5,907,867 A | 5/1999 | Shinbo et al. |
| 6,205,530 B1 | 3/2001 | Kang |
| 6,205,531 B1 | 3/2001 | Hussain |
| 6,374,341 B1 | 4/2002 | Nijhawan et al. |
| 7,003,647 B2 | 2/2006 | Jacobs et al. |
| 7,426,626 B2 | 9/2008 | Augsburg et al. |
| 7,917,725 B2 | 3/2011 | Stecher |

(Continued)

OTHER PUBLICATIONS

"IEEE Xplore Abstract: A dynamic TLB management structure to support different page sizes", Retrieved from URL: http://ieeexplore.ieee.org/xpl/login.jsp?tp=8,arnumber=8969678,url=http%3A%2F/02Fieeexplore.ieee.org%2Fxpls%2Fabs_all.jsp%3Farnumber%3D896967, Aug. 15, 2015, pp. 1-2.

*Primary Examiner* — Edward Dudek, Jr.
*Assistant Examiner* — Sidney Li
(74) *Attorney, Agent, or Firm* — Robert C. Kowert; Meyertons, Hood, Kivlin, Kowert & Goetzel, P.C.

(57) ABSTRACT

In some embodiments, a memory overlay system comprises a translation lookaside buffer (TLB) that includes an entry that specifies a virtual address range that is a subset of a virtual address range specified by another entry. In response to an indication from the TLB that both of the entries are TLB hits for the same memory operation, a selection circuit is configured to select, based on one or more selection criteria, one of the two entries. The selection circuit may then cause the selected TLB entry including the corresponding physical address information and memory attributes to be provided to a memory interface.

20 Claims, 10 Drawing Sheets

(56) References Cited

U.S. PATENT DOCUMENTS

| | | | |
|---|---|---|---|
| 2002/0062409 A1* | 5/2002 | Lasserre | G06F 1/206 710/22 |
| 2007/0050594 A1 | 3/2007 | Augsburg et al. | |
| 2010/0100685 A1* | 4/2010 | Kurosawa | G06F 12/1054 711/128 |
| 2013/0007407 A1* | 1/2013 | Gupta | G06F 12/1036 711/207 |
| 2014/0189192 A1 | 7/2014 | Raikin et al. | |
| 2015/0143332 A1* | 5/2015 | Thomas | G06F 8/10 717/120 |

* cited by examiner

VIRTUAL MEMORY PAGE MAPPING OVERLAYS

BACKGROUND

Technical Field

This disclosure relates to computing systems, and, more particularly, to a memory page mapping overlay system.

Description of the Related Art

In computer systems that implement virtual memory, operating systems or managed runtimes on occasion need to alter the attributes of particular segments of memory. For example, access permissions for certain segments of an address space may be changed from "read/write" to "read only" or from "read only" to "no access." This may occur to prevent an application thread from accessing a contingent data structure, such as a page that is being modified by a runtime executive. For example, a garbage collector may lock down a region of heap memory while it operates on its contents, in order to prevent concurrent access by mutator threads. As another example, an operating system performing a copy-on-write optimization may change access permission for a single page of memory to be writable private storage, while surrounding pages are mapped from a file.

To change access permissions for a particular page of memory, a computer system can change access permissions for a corresponding page table entry of a translation lookaside buffer (TLB). Each page table entry of a TLB maps a virtual page to a physical page of memory, along with additional information associated with the physical page of memory, such as access permissions. Typically, memory pages are relatively small (e.g., 4 kilobytes or 8 kilobytes), which allows access permissions to be changed for small portions of memory. However, there are benefits for using larger memory pages (e.g., 4 megabytes or 1 gigabyte). Large memory pages allow a computer system to map addresses from a smaller working set of page mapping descriptors (e.g., using fewer bits). For example, one descriptor can cover many megabytes of memory instead of 8 kilobytes.

TLBs are in the critical path of memory access because elements of a TLB are consulted on each memory access. TLBs may burn hot and occupy a large amount of chip area. Therefore, implementing large page sizes can reduce the demand that is placed on a TLB. However, using large pages may also introduce inefficiencies that cause certain techniques, such copy-on-write or locking a page, to increase program execution time and reduce system performance. For example, changing access permission for a to gigabyte-sized memory page to "read-only" or "no-access" may interfere with and delay the execution of many different application threads.

SUMMARY

Systems and methods for implementing memory page mapping overlays are contemplated. In one embodiment, a memory overlay system is disclosed that may allow attributes (e.g., memory access permissions) for a small overlay page within a large page to be different than attributes for the large page. In particular, in one embodiment, a translation lookaside buffer (TLB) includes an entry that specifies a virtual address range that is a subset of a virtual address range specified by another entry. In response to an indication from the TLB that both of the entries are TLB hits for the same memory operation, a selection circuit is configured to select, based on one or more selection criteria, one of the two entries. The selection circuit may then cause the selected TLB entry including the corresponding physical address information and memory attributes to be provided to a memory interface. Additionally, the selection circuit may receive respective overlay indicators for the two entries. The selection circuit may select one of the two entries based on respective states of the respective overlay indicators for the two entries. In some cases, the selection circuit is configured to select one of the two entries based on one or more different selection criteria or one or more additional selection criteria. Accordingly, when an overlay entry is selected, a memory access permission for the overlay page (e.g., read/write) may override a different memory access permission for a large page (e.g., read only) that encompasses the overlay page.

These and other embodiments will become apparent upon reference to the following description and accompanying drawings.

Figure 1:
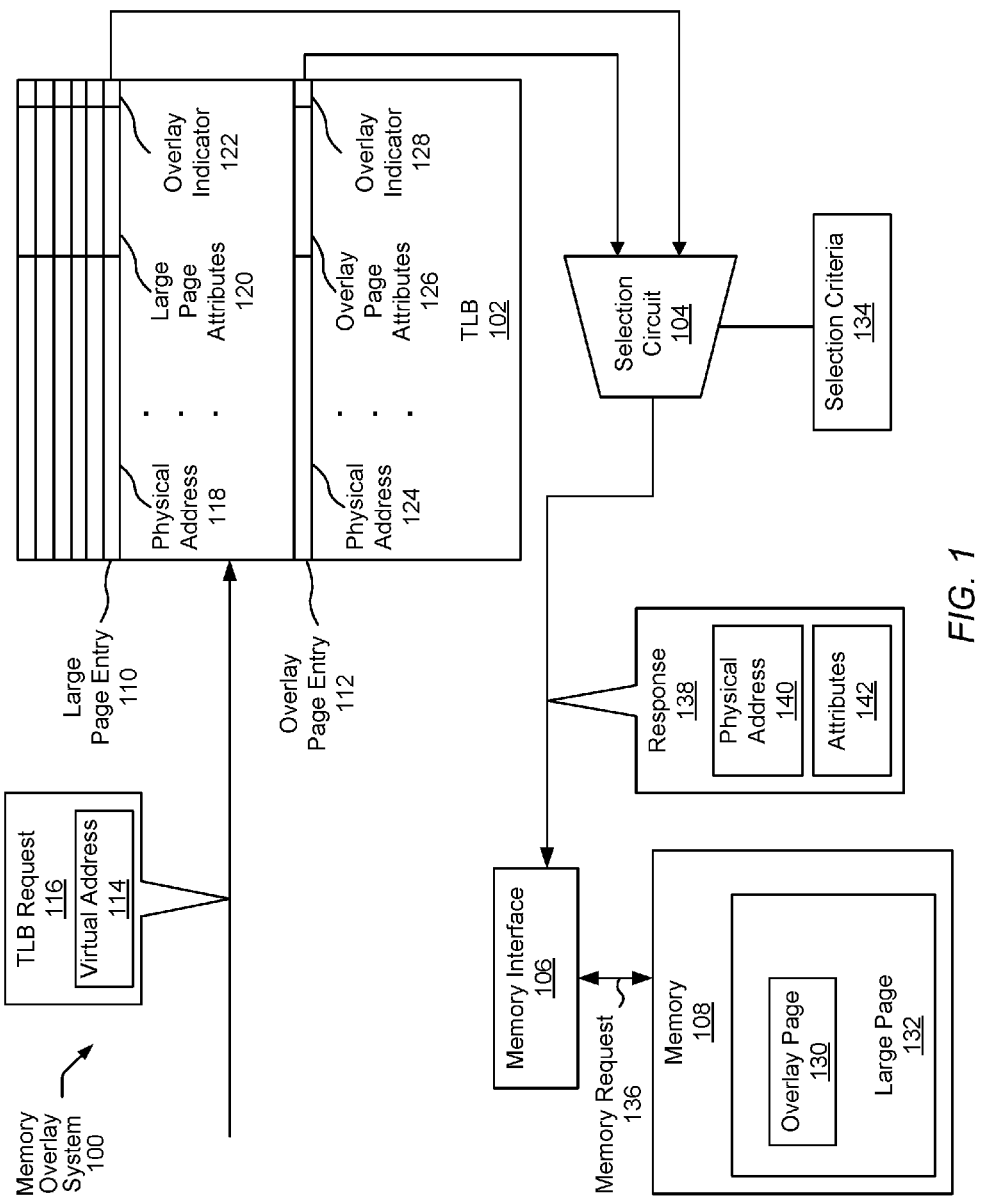
FIG. 1 is a block diagram illustrating one embodiment of an exemplary memory overlay system.

While the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment," or similar phrases do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "translation lookaside buffer configured to" perform a particular function is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software construct such as an application programming interface (API).

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a processor having eight processing elements or cores, the terms "first processing element" and "second processing element" can be used to refer to any two of the eight processing elements, and not, for example, just logical processing elements 0 and 1.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION

A memory overlay system is disclosed that may allow attributes (e.g., memory access permissions) for a small overlay page within a large page to be different than attributes for the large page. In some embodiments, when a translation lookaside buffer (TLB) includes a large page entry and an overlay page entry that are both hits for a received virtual memory address, the memory overlay system selects one of the entries based on selection criteria, and uses the attributes of the selected entry for the corresponding physical memory address. Thus, instead of generating a TLB error, the memory overlay system determines which of the entries to select.

In an embodiment, if an overlay entry is selected, then a memory access permission for the overlay page (e.g., read/write) may override a memory access permission for a large page (e.g., read only) that encompasses the overlay page. Thus, one or more overlay pages may create small "windows" of a different level of memory access permission within a large page. In some embodiments, page entries of the TLB may include an overlay indicator that, when set, indicates that the page entry is an overlay page entry.

Various embodiments described herein may include circuitry for virtual memory address mapping hardware that allows small and large pages to co-exist over the same spans of virtual address space. In an embodiment, precedence may be given to a small page descriptor over the large page descriptor, when both of the page descriptors apply to the same memory locations.

Embodiments of the system may be used in various applications, such as managed runtimes, databases, and secured operating systems. For example, a Java virtual machine (JVM) garbage collector may "lock down" one or more small "windows" in a large heap, while a majority of the heap is controlled by a single large-scale TLB entry. The garbage collector thread itself may obtain normal access to the locked windows, simply by omitting the "locking" entries from the TLB of its own virtual processor. Thus, systems running Java may exhibit increased performance, density, and reliability.

In another particular embodiment, a hardened operating system or database system may implement journaling (e.g., logging) of memory updates by setting a large segment as read only but re-mapping small windows of the segment to read/write, so they can be written to (e.g., using a copy-on-write technique). In an embodiment, if the number of read/write windows exceeds a threshold, the memory overlay system may store changes for one or more of the windows to a backing store, and then re-protecting the one or more windows by applying read only access permission to them (thereby simplifying the contents of the TLB). Thus, the hardened operating system or database may increase efficiency with respect to monitoring activities of tenant processes and increase efficiency for tracking changes to critical data.

In an embodiment, page mappings of different virtual processors operating in the same address space may respectively be given one or more windows to implement per-thread privileges, by either increasing memory access permissions for windows (e.g. adding write or execute permissions) or decreasing memory access permissions for windows (e.g., subtracting write or execute permissions). Therefore, high performance tightly coupled systems may contain both less-trusted tenant threads (e.g., with decreased access permissions) and more-trusted management threads (e.g., with increased access permissions). In a processor or computer chip that has a TLB shared between multiple virtual processors, a pair of context descriptors may be used to select either the normal, non-overlay mappings with corresponding permissions (e.g., large page mappings) or the overlay page mappings with corresponding permissions. Thus, a computing system, such as a cloud-based system, may execute untrusted code in a more robust and reliable manner, while privileged threads of the managed runtime may operate at full speed or with increased efficiency (e.g., improving density without compromising security)

In another embodiment, overlay pages may be implemented as a tracking mechanism for a live migration of an application. For example, if a 4 GB page is being copied for the migration, overlay pages may provide a way of tracking what areas of memory a task has changed and/or touched while performing the copy. By marking small regions (e.g., using overlay windows), the task can be paused and only the small regions that were changed and/or touched may be copied over before completing the migration. Thus, the amount of time for a full pause step for the migration would be minimized and/or reduced. In an embodiment, when the application is in a migrating state, all or most pages may be set to read only or no access to prevent other applications from making changes to the memory being migrated. Thus, a limited number of overlay windows may allow threads to make some forward progress.

In various embodiments, a maximum number of overlays per thread at a time may be enforced. In an embodiment, an overlay window is implemented on a per-core basis or a per-strand basis. Thus, some strands may be granted the option of using overlay pages, while some may not.

In embodiments, one or more application strands may be locked out from a garbage collector strand, which in turn may operate without any restrictions associated with overlay windows. In an embodiment, a garbage collector thread and one or more application threads may have related but distinct processing contexts. In various embodiments, a garbage collector, journaling mechanism, checkpointing mechanism, or any other process or application with competing rights to other application threads may implement overlay pages to block access by the other application threads.

Figure 2:
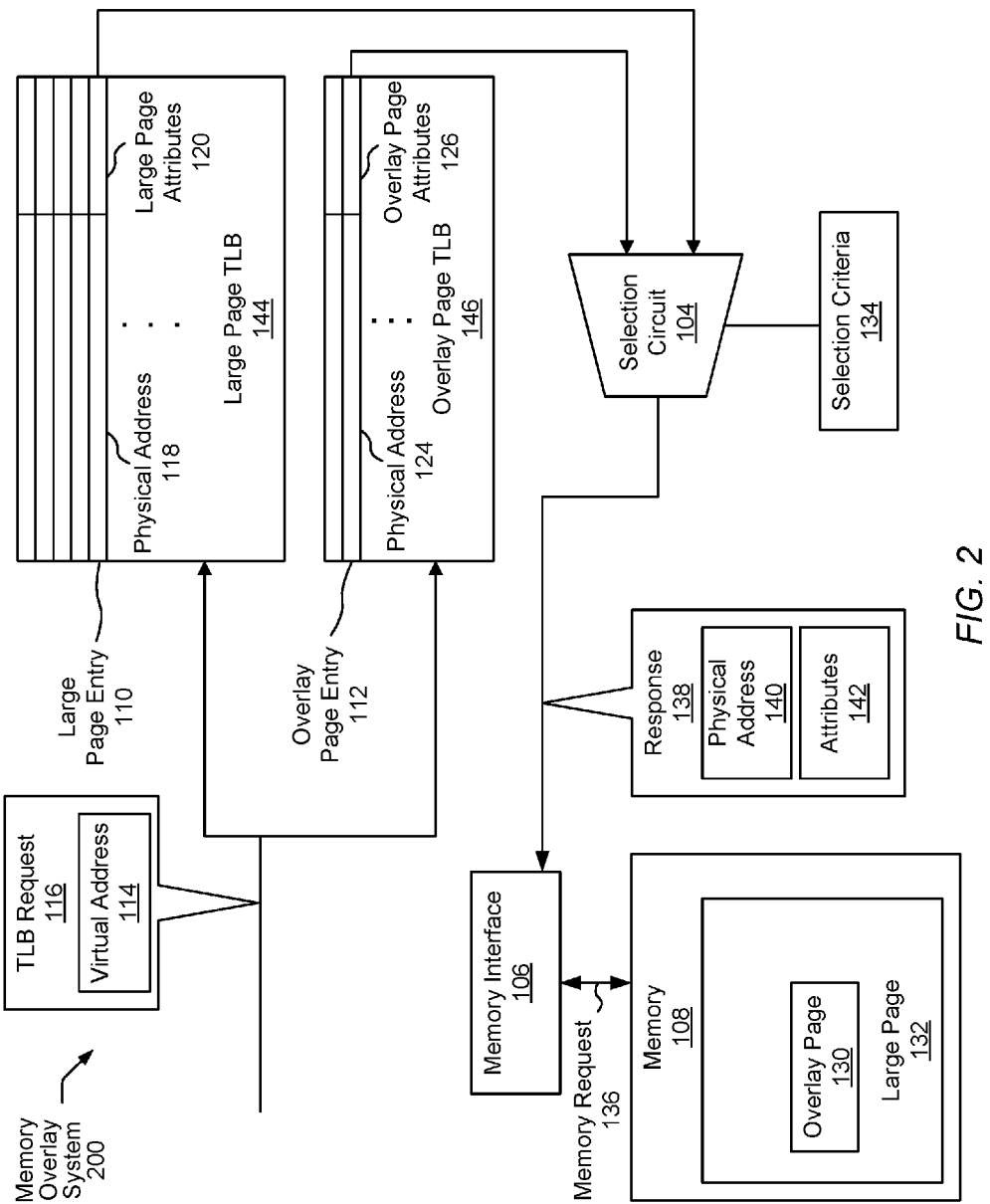
FIG. 2 is a block diagram illustrating one embodiment of an exemplary memory overlay system.

This disclosure initially describes, with reference to FIGS. 1 and 2, functions of various portions of an embodiment of a memory overlay system and describes various actions taken by the embodiment of the memory overlay system in response to an exemplary TLB request associated with a memory instruction. An example memory page mapping for a large page and an overlay page of a memory overlay system are described with reference to FIG. 3. An example of a memory of a memory overlay system, including large pages and overlay pages, is described with reference to FIG. 4. An example overlay selection circuit of a memory overlay system is described with reference to FIGS. 5 and 6. An embodiment of a memory overlay system with multiple TLB's is described with reference to FIG. 7. The techniques and structures described herein, however, are in no way limited to the one or more memory overlay systems shown in FIGS. 1-7; rather, this context is provided only as one or more possible implementations. Methods performed by an embodiment of a memory overlay system are described with reference to FIGS. 8 and 9. Finally, an exemplary computing system that includes a memory overlay system is described with reference to FIG. 10.

Turning now to FIG. 1, a block diagram of one embodiment of an exemplary memory overlay system 100 is shown. In the illustrated embodiment, memory overlay system 100 includes a TLB 102, a selection circuit 104, a memory interface 106, and a memory 108. In embodiments, the memory overlay system 100 may be implemented by a computing system, such as the computing system 1000 of FIG. 10. A processor of such a computing system may include the TLB 102 and/or the selection circuit 104.

The TLB 102 may be a memory cache that stores recent translations of virtual memory addresses to physical memory addresses, to allow for faster retrieval during a memory operation. In some embodiments, when a software program references a virtual memory address, the memory overlay system 100 may search for the physical memory address that maps to the virtual memory address. The memory overlay system 100 may search the TLB 102 for a translation of the virtual memory address to the physical memory address. If the translation exists as an entry in the TLB 102, then the memory overlay system 100 may access the physical memory based on the physical address translation provided by the entry. Thus, the entry is a TLB "hit."

In some embodiments, when the TLB 102 does not include an entry that provides the translation to a physical address (a TLB "miss"), then the memory overlay system 100 may determine a translation by continuing to search for the corresponding physical address using page tables, a memory page crawl operation, or other technique. When the translation is determined, the memory overlay system 100 may add a new entry to the TLB 102 that includes the translation information for the virtual memory address. In some embodiments, the memory overlay system 100 may determine a translation for the virtual memory address more quickly when there is a TLB hit, as opposed to searching for the translation when there is a TLB miss. Thus, the TLB 102 may provide the advantages and functionality typically provided by TLB's.

In the example embodiment, the TLB 102 allows for two TLB hits for a particular virtual memory address and instead of generating an error, the memory overlay system 102 selects one of the entries. Thus, the TLB 102 may add, store, and/or create one or more entries that cover one or more corresponding relatively smaller virtual address ranges even though another entry covering a relatively larger virtual address range including the one or more corresponding relatively smaller virtual address ranges already exists in the TLB 102. For example, the TLB 102 may create the overlay page entry 112 even though the large page entry 110 already exists in the TLB 102. In embodiments, the TLB 102 may first create a large page entry 110 and then create one or more overlay entries, such as the overlay page entry 112, that each cover a relatively smaller virtual address range than that of the overlay page entry 112 and that are each included within the virtual address range of the overly page entry 112.

Thus, in embodiments, both the large page entry 110 and the overlay page entry 112 may be hits for a received virtual memory address 114 of a TLB request 116. Thus, both the large page entry 110 and the overlay page entry 112 are TLB hits for the same memory operation. The large page entry 110 includes at least a physical address 118, large page attributes 120, and an overlay indicator 122. The overlay page entry 112 includes at least a physical address 124, overlay page attributes 126, and an overlay indicator 128. In an embodiment, the physical address 118 is the same as the physical address 124, resulting in the two TLB hits.

In some embodiments, to translate the virtual address 114 to the physical address 118 and/or the physical address 124, the memory overlay system 100 may use the entire addresses or a just a portion of the addresses (e.g., a page tag or page number). For example, a page tag portion of the virtual address may translate to a page tag portion of the physical address 118 and/or the physical address 124 to cause TLB hits. To determine the translated physical memory address that corresponds to the virtual memory address 114, the memory overlay system 100 may then add an offset to the page tag portion of the physical address 118 and/or the physical address 124.

In the depicted embodiment, the overlay page entry 112 specifies a virtual address range that is a subset of a virtual address range specified by the large page entry 110. The subset may be less than the virtual address range of the large page entry 110 and fully encompassed within the range of the large page entry 110. In an embodiment, the overlay indicator 128 of the overlay page entry 112 may be set to indicate that the overlay page entry 112 specifies a virtual address range that corresponds to the overlay page 130 of the memory 108. Conversely, the overlay indicator 122 of the large page entry 110 may be set to indicate that the large page entry 110 specifies a virtual address range that corresponds to the large page 132 of the memory 108. In the example embodiment, the address range of the overlay page 130 is a subset of the address range of the large page 132. Thus, the address space of the overlay page 130 co-exists with a portion of the address space of the large page 132.

In some embodiments, in response to a TLB hit for both the overlay page entry 112 and the large page entry 110, the selection circuit 134 selects the overlay page entry 112 or the large page entry 110 based on one or more selection criteria 134. For example, the selection circuit 134 may select one of the two entries based at least on a state of the overlay indicator 128 of the overlay page entry 112 and the overlay indicator 122 of the large page entry 110. If the overlay indicator 128 of the overlay page entry 112 is set and the overlay indicator 122 of the large page entry 110 is not set, then the selection circuit 134 may select the overlay page entry 112. Conversely, in an embodiment, if the overlay indicator 128 of the overlay page entry 112 is not set and the overlay indicator 122 of the large page entry 110 is set, then the selection circuit 134 may select the large page entry 110.

In an embodiment, the selection circuit 134 causes the selected entry, including at least the corresponding physical address information and memory attributes, to be provided to a memory interface 106, which accesses the memory 108 via a memory request 136. For example, the selection circuit 134 may select the overlay page entry 112 and output a response 138 that includes at least a physical address 140 that corresponds to the physical address 124 and attributes 142 that correspond to the overlay page attributes 126. Conversely, the selection circuit 134 may select the large page entry 110 and output a response 138 that includes at least the physical address 140 that corresponds to the physical address 204 and the attributes 142 that correspond to the large page attributes 120.

The overlay page attributes 126 and the large page attributes 120 may each be one or more types of attributes useful for applying to a range or a page of the memory 108. In embodiments, the value of the overlay page attributes 126 is different than the value of the large page attributes 120, in order to create the overlay page 130 "window" within the large page 132 that overrides the large page attributes 120 with the overlay page attributes when certain conditions are met, such as satisfying one or more of the selection criteria 134.

For example, the overlay page attributes 126 may include a level of memory access permission (e.g., read/write) and the large page attributes 120 may include a different level of memory access permission (e.g., read only). Thus, for a memory operation that affects the overlay page 132, two entries are TLB hits, and the selection circuit 104 may select the overlay page entry 112, allowing the memory operation to write data to the overlay page 130. If another memory operation causes only one TLB hit that corresponds to the large page 132, but outside of the overlay page 130, then the TLB may process the memory operation normally, without using the selection circuit.

In various embodiments, any suitable technique may be used by the memory overlay system 100 to update or insert two entries into the TLB 102 to allow use of overlay pages within large pages. In some embodiments, the memory overlay system 100 stores, tracks, and/or updates relationships between individual overlay pages and the corresponding large pages. For example, for an overlay page, the memory overlay system 100 may store address ranges of one or more overlay pages that correspond to a particular large page. Thus, when the particular large page entry is inserted into the TLB, the memory overlay system 100 may insert one or more additional overlay page entries that each correspond to a respective subset of the address range of the large page entry. In some embodiments, only one overlay page entry may be added to the TLB, as needed. In some instances, an application program may add, remove, or otherwise modify the relationships between individual overlay pages and the corresponding large pages through the use of one or more low-level commands, such as application program interfaces (API's) for the memory overlay system 100.

Therefore, the memory overlay system 100 may ensure that two entries exist when a particular overlay page is added to the TLB 102. In an embodiment, when the particular overlay page is removed from the TLB 102, then the corresponding large page entry is also removed (unless there are one or more other overlay page entries that corresponds to the large page). In some embodiments, the memory overlay system 100 may modify the overlay mappings 110 on a periodic basis and/or in response to an event (e.g., instruction or trigger).

FIG. 2 is a block diagram illustrating one embodiment of an exemplary memory overlay system 200. Instead of one TLB 102 as in FIG. 1., the example embodiment of the memory overlay system 200 includes a large page TLB 144 and an overlay page TLB 146 to respectively store large page entries and overlay page entries. However, other aspects of the example embodiment are similar to the memory overlay system 100 of FIG. 1. For example, the memory overlay system 200 includes a selection circuit 104, a memory interface 106 that sends a memory request 136, a memory 108 comprising an overlay page 130 and a large page 132, a large page entry 110 with a physical address 118 and large page attributes 120, an overlay page entry 112 with a physical address 124 and overlay page attributes 126, a TLB request 116 comprising a virtual address 114, one or more selection criteria 134, and a response 138 comprising at least a physical address 140 and corresponding attributes 142.

As shown, the large page TLB 144 comprises one or more large page entries, including the large page entry 110. The overlay page TLB 146 comprises one or more overlay page entries, including the overlay page entry 112. In embodiments, the large page TLB 144 includes a portion of a memory or buffer that is reserved for storing large page entries and the overlay page TLB 146 includes a portion of a memory or buffer that is reserved for storing overlay page entries.

In the example embodiment, the large page entries of the large page TLB 144 and the overlay page entries of the overlay page TLB 146 do not include overlay indicators, as described for the memory overlay system of FIG. 1. However, in some embodiments, the large page entries of the large page TLB 144 and the overlay page entries of the overlay page TLB 146 may also include respective overlay indicators.

In the indicated embodiment, the large page TLB 144 outputs information to a particular input or path of the selection circuit, and the overlay page TLB 146 outputs information to another input or path of the selection circuit. Based on one or more selection criteria 134, the selection circuit 104 selects the information from the large page TLB 144 or the information from the overlay page TLB 146. Therefore, the selection circuit 104 may select one of the large page entry 110 or the overlay page entry 112 based on the one or more selection criteria.

The selection criteria may include an overlay indicator that, when set, causes the selection circuit 104 to select the overlay page entry 112 and, when not set, causes the selection circuit 104 to select the large page entry 110. Any suitable technique for implementing an overlay indicator may be used. For example, a register for a particular thread (e.g., a thread state register) may include an overlay indicator (e.g., a flag bit or other metadata) that is set. Thus, the particular thread may access the overlay page 130 in accordance with the overlay page attributes 126 (e.g., read/write access level). A different thread, however, may not have the overlay indicator set. Therefore, the different thread may only access the same portion of memory in accordance with the large page attributes 120 (e.g., read only access level). In some embodiments, this above technique allows virtual threads to operate with overlay pages suppressed, while other threads in the same address space use overlay pages. Further, in various embodiments, any other register or storage element that stores information specific to a processing context for a particular memory operation may implement an overlay indicator to suppress or allow overlay pages.

Figure 3:
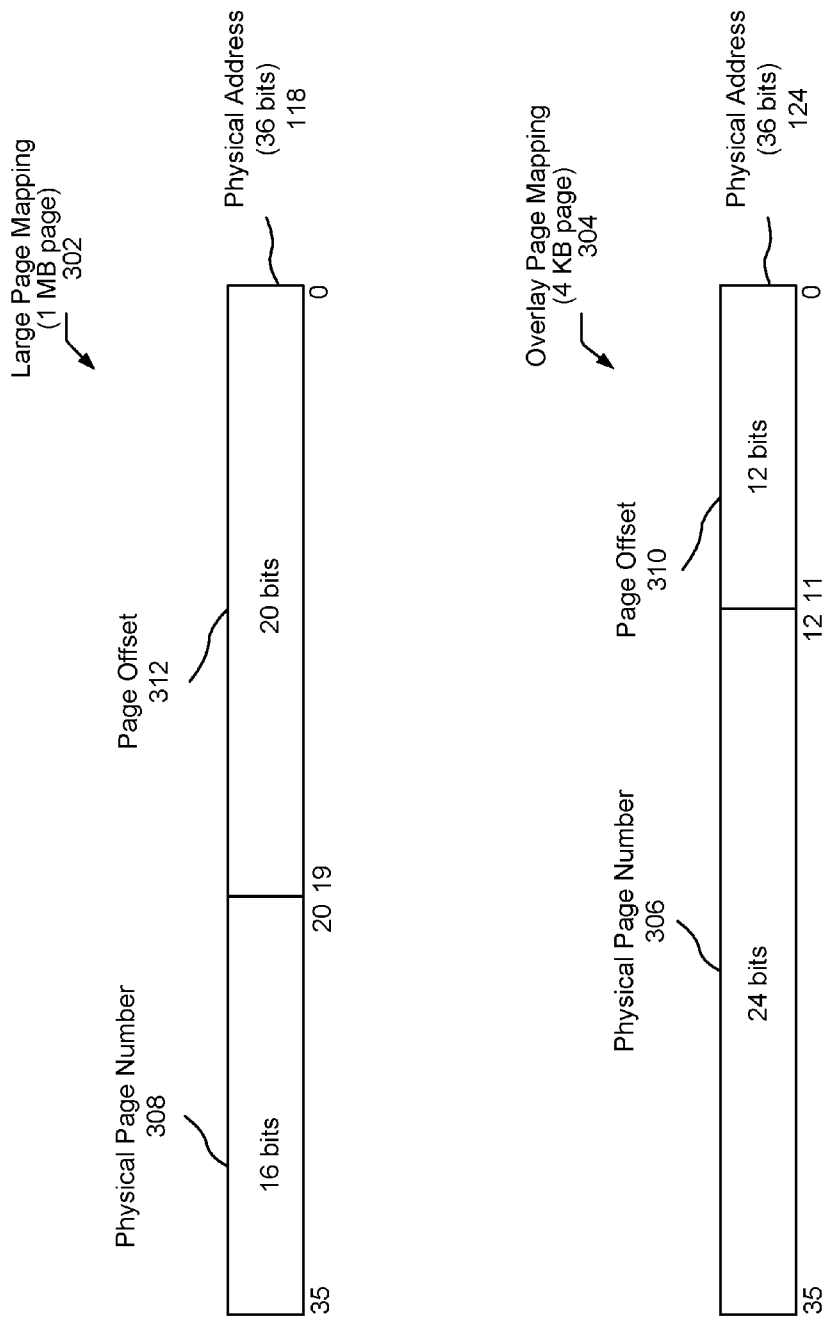
FIG. 3 is a block diagram illustrating an exemplary memory page mapping for a memory overlay system.

FIG. 3 is a block diagram illustrating an exemplary memory page mapping for a memory overlay system. In the illustrated embodiment, the large page mapping 302 includes an example of the memory overlay system 100 mapping the physical address 118 of the large page entry 110 to the large page 132 of the memory 108. Similarly, the overlay page mapping 304 includes an example of the memory overlay system 100 mapping the physical address 124 of the overlay page entry 112 to the overlay page 132 of the memory 108.

In the example embodiment, the virtual address range of the overlay page entry 112 corresponds to a subset of the virtual address range of the large page entry 110. Therefore, in embodiments, the memory overlay system 100 maps the virtual address 114 to a physical page number 306 of the overlay entry 112 and maps the virtual address 114 a physical page number 308 of the large page entry 110, such that the physical page number 306 of the overlay entry 112 corresponds to a subset of a physical address range of the physical page number 308 of the large page entry 110.

In the depicted embodiment, the physical page number 306 of the overlay entry 112 is 24 bits long, which corresponds to a smaller physical address range (e.g., 4 KB overlay page 130), whereas the physical page number 308 of the large entry 112 is 16 bits long, which corresponds to a larger physical address range (e.g., 1 MB large page 132). In the particular embodiment, since the physical address length is 36 bits, the memory overlay system 100 uses the remaining 12 bits of the physical address 124 as the page offset 310 for the overlay page 130 and the remaining 20 bits of the physical address 118 as the page offset 310 for the large page 132.

Figure 4:
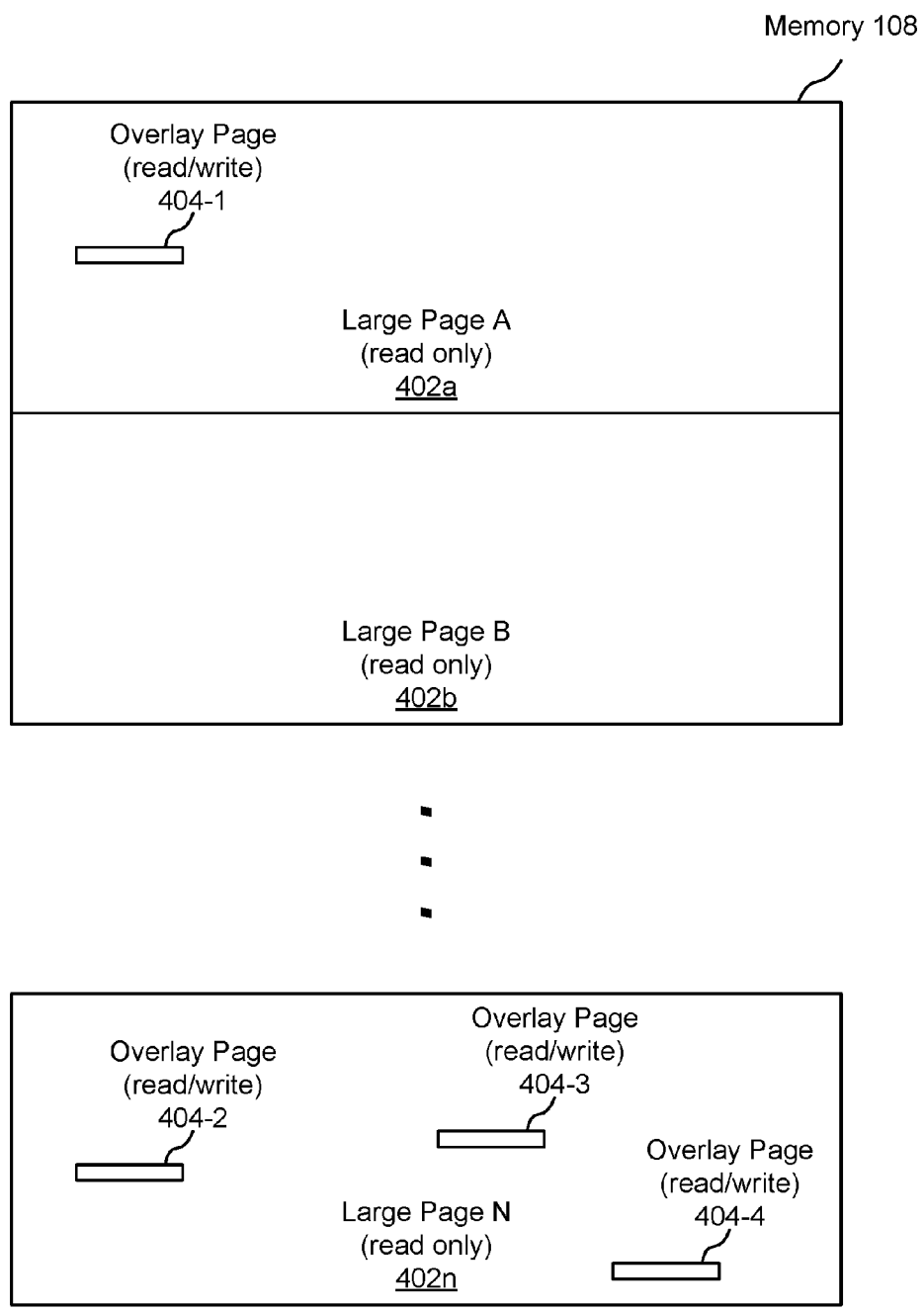
FIG. 4 is a block diagram illustrating an exemplary memory of a memory overlay system.

FIG. 4 is a block diagram illustrating an exemplary memory 108 of a memory overlay system 100. In the illustrated embodiment, the memory 108 may include multiple large pages, including large pages 402a, 402b, and 402n. In embodiments, the memory may include a smaller or larger number of large pages. Large page 402a includes an overlay page 404-1, large page 402b includes no overlay pages, and large page 402n includes overlay pages 404-2, 404-3, and 404-4.

In a particular embodiment, the large pages 402a, 402b, and 402n each correspond to a respective large page entry of a TLB, such as the large page entry 110 of the TLB 102. The large page entries may each include an attribute that corresponds to read only access permission. The overlay pages 404-1, 404-2, 404-3, and 404-4 each correspond to a respective overlay page entry of a TLB, such as the overlay page entry 112 of the TLB 102. The overlay page entries may each include an attribute that corresponds to read/write access permission. Thus, as described above, overlay pages may be used to create a read/write access permission "window" within the large page 402a and three different read/write access permission "windows" within the large page 402n. In various embodiments, any smaller or larger number of overlay pages may be implemented within any of the large pages.

Figure 5:
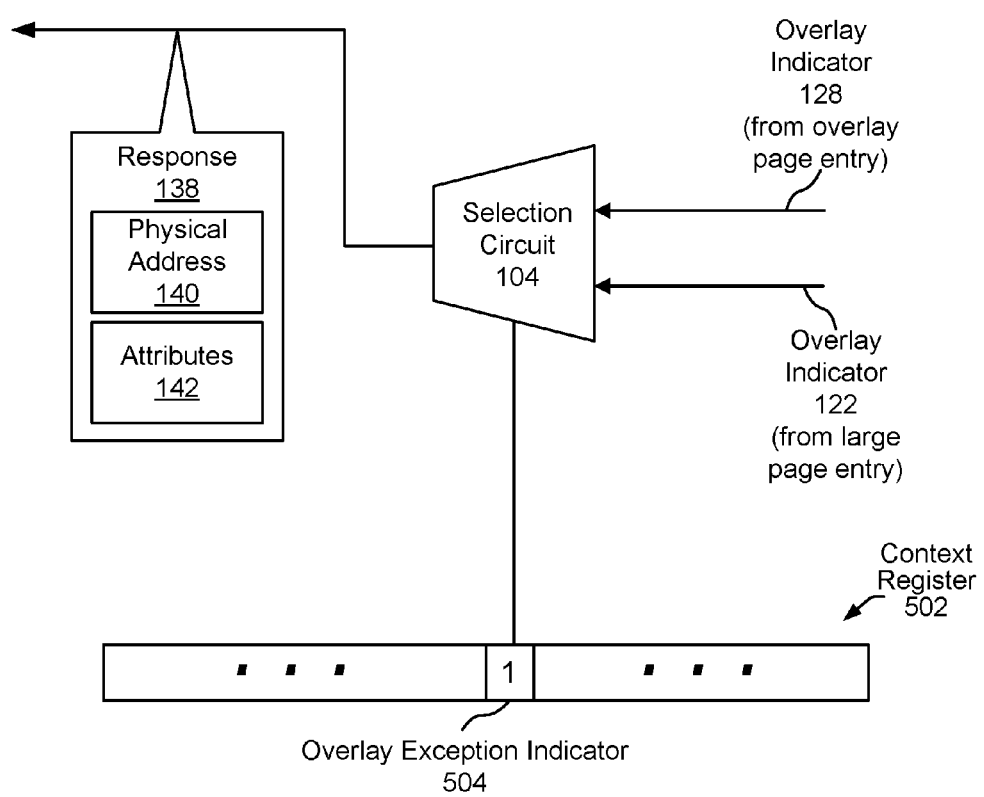
FIG. 5 is a block diagram illustrating an exemplary selection circuit of a memory overlay system.

FIG. 5 is a block diagram illustrating an exemplary selection circuit 104 of a memory overlay system 100. In the illustrated embodiment, a context register 502 includes an overlay exception indicator 504. The selection criteria 134 may include the overlay exception indicator 504, which may override an overlay indicator of a TLB entry. The context register may be a thread state register or any other register or storage element that stores information specific to a processing context for a particular memory operation.

In a particular embodiment, the selection criteria 134 for selecting one of the overlay page entry 112 or the large page entry 110 may include the overlay indicator 128 from the overlay page entry 112, the overlay indicator 122 from the large page entry 110, and the overlay exception indicator 504. For example, when the overlay indicator 128 of the overlay page entry 112 is set and the overlay indicator 122 of the large page entry 110 is not set, then the selection circuit 104 selects the large page entry 110 if the overlay exception indicator 504 is set or selects the overlay page entry 112 if the overlay exception indicator 504 is not set. Similarly, when the overlay indicator 128 of the overlay page entry 112 is not set and the overlay indicator 122 of the large page entry 110 is set, then the selection circuit 104 selects the overlay page entry 112 if the overlay exception indicator 504 is set or selects the large page entry 110 if the overlay exception indicator 504 is not set. Thus, the overlay exception indicator 504 may override the overlay indicators of the TLB entries.

In some embodiments, the selection circuit 104 only outputs an indication of the selected page entry. For example, the selection circuit 104 may either output information that indicates the overlay page entry 112 is selected or output information that indicates the large page entry 110 is selected. In some instances, the selection circuit 104 may output additional information in a response 138, such as the physical address 140 of the selected entry and/or the attributes 142 of the selected entry.

Figure 6:
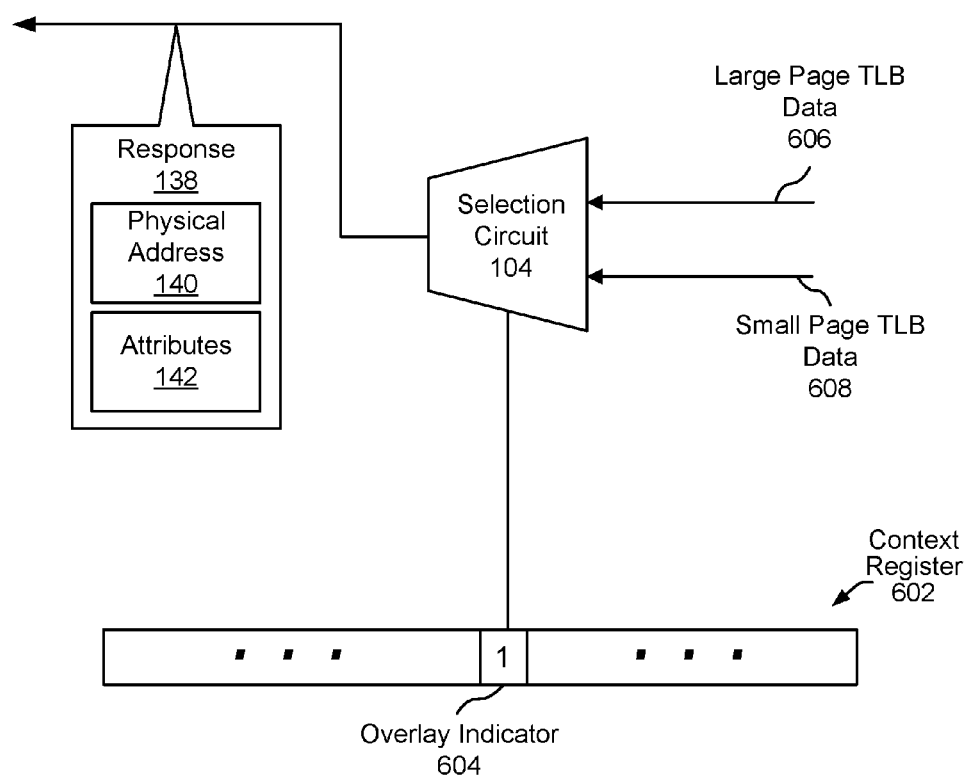
FIG. 6 is a block diagram illustrating an exemplary selection circuit of a memory overlay system.

FIG. 6 is a block diagram illustrating an exemplary selection circuit 104 of a memory overlay system 200. In the illustrated embodiment, a context register 602 includes an overlay indicator 604. The selection criteria 134 may include the overlay indicator 604. In some embodiments, one or more additional selection criteria may be used. The context register may be a thread state register or any other register or storage element that stores information specific to a processing context for a particular memory operation.

In a particular embodiment, the selection circuit 104 may receive overlay page TLB data 606 from the overlay page TLB 146 and large page TLB data 608 from the large page TLB 144. The selection criteria 134 for selecting one of the overlay page entry 112 or the large page entry 110 may include the overlay indicator 604. For example, when the overlay indicator 604 is set and the selection circuit receives both overlay page TLB data 606 and large page TLB data 608, then the selection circuit 104 selects the overlay page entry 112. Conversely, when the overlay indicator 604 is not set and the selection circuit receives both overlay page TLB data 606 and large page TLB data 608, then the selection circuit 104 selects the large page entry 112. Thus, the selection circuit 104 may select one of the overlay page entry 112 or the large page entry 110 based on the state of the overlay indicator 604.

In some embodiments, the selection circuit 104 may provide a response 138 that includes at least the physical address 140 and/or the attributes 142 of the selected entry. In an embodiment, the selection circuit 104 receives the physical address and/or attributes from the overlay page TLB data 606 and the large page TLB data 608.

In some instances, the selection circuit may receive only one input that indicates if there was a hit at both the large page TLB 144 and the overlay page TLB.

For example, if both TLB's hit for a particular virtual address 114, then the selection circuit 104 receives an indication that both TLB's hit and selects one of the overlay page entry 112 or the large page entry 110 based on the state of the overlay indicator 604.

Figure 7:
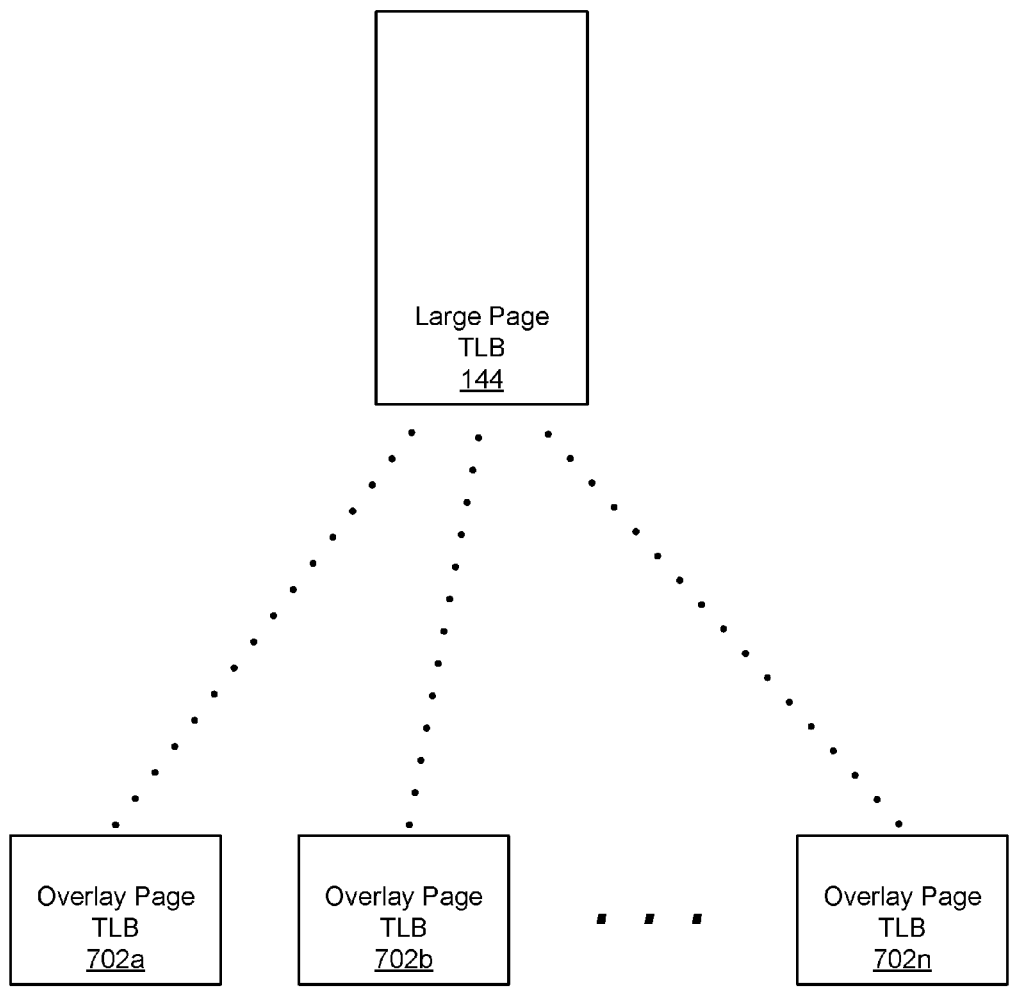
FIG. 7 is a block diagram illustrating an exemplary TLB arrangement of a memory overlay system.

FIG. 7 is a block diagram illustrating an exemplary TLB arrangement of a memory overlay system 200. In the illustrated embodiment, multiple overlay page TLB's 702 may correspond to one large page TLB 144. For example, each overlay page TLB 702 may correspond to a respective processing context, while the large page TLB 144 is shared among each respective processing context. In some embodiments, each overlay page TLB 702 may correspond to a different thread (or strand), but the threads all share the same large page TLB 144.

In some instances, multiple instances of an entire TLB may be implemented for each strand (e.g., the TLB of the memory overlay system 100). However, this may be a more costly option, because both overlay page TLB entries and large page TLB entries would need to be replicated for each strand.

Figure 8:
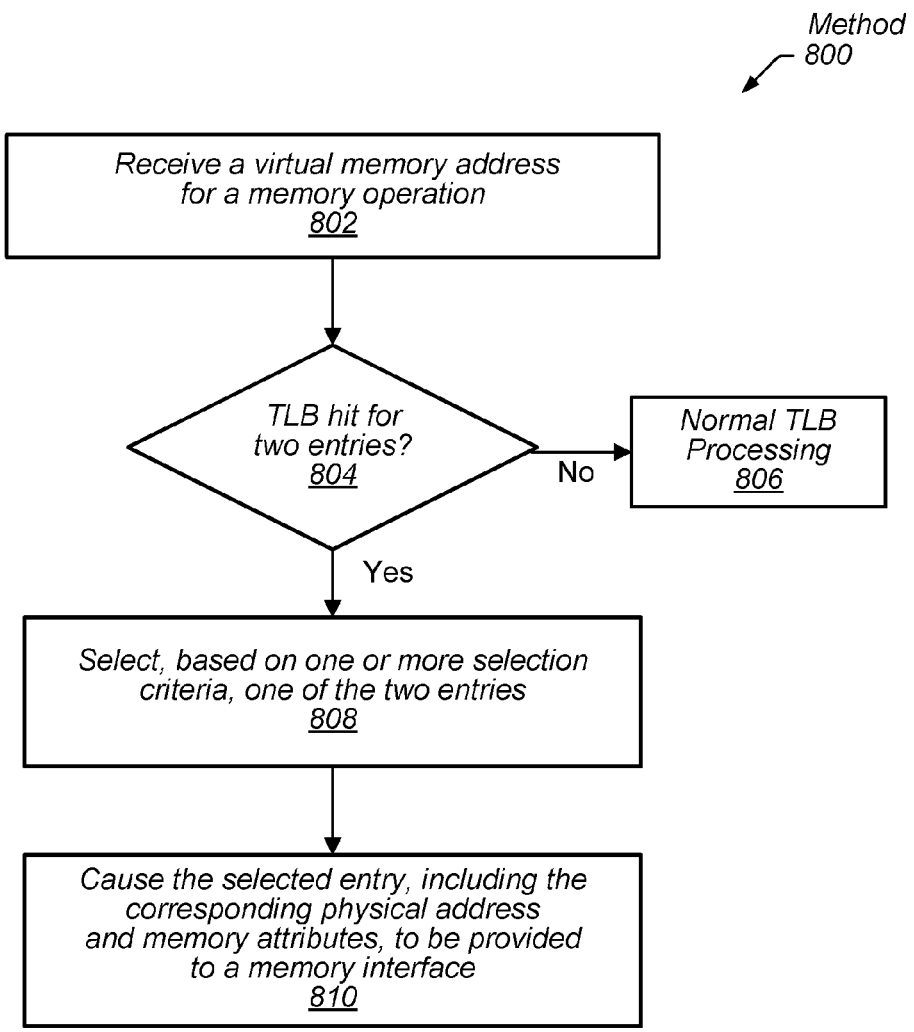
FIG. 8 is a flow diagram illustrating one embodiment of a method of operating a memory overlay system.

FIG. 8 is a flow diagram illustrating one embodiment of a method 800 of operating a memory overlay system 100. Some portions of the method 800 may be performed in other orders or simultaneously.

At 802, the method includes receiving a virtual memory address for a memory operation. For example, the TLB 102 may receive the virtual address 114. At 804, the method determines if there is a TLB hit for two TLB entries. If there is only one hit, then the method proceeds to 806 for normal TLB processing. If there is a TLB hit for two TLB entries, then at 808, the method selects, based on one or more selection criteria 134, one of the two entries that hit. For example, the selection criteria 134 may include overlay indicators from each of the two entries and/or an indicator from a context register. A selection circuit 104 may select one of the two entries based on the selection criteria 134. At 810, the method causes the selected entry, including the corresponding physical address and memory attributes, to be provided to a memory interface. For example, the selection circuit 104 may cause the physical address 140 and the attributes 142 to be provided to the memory interface 106.

Figure 9:
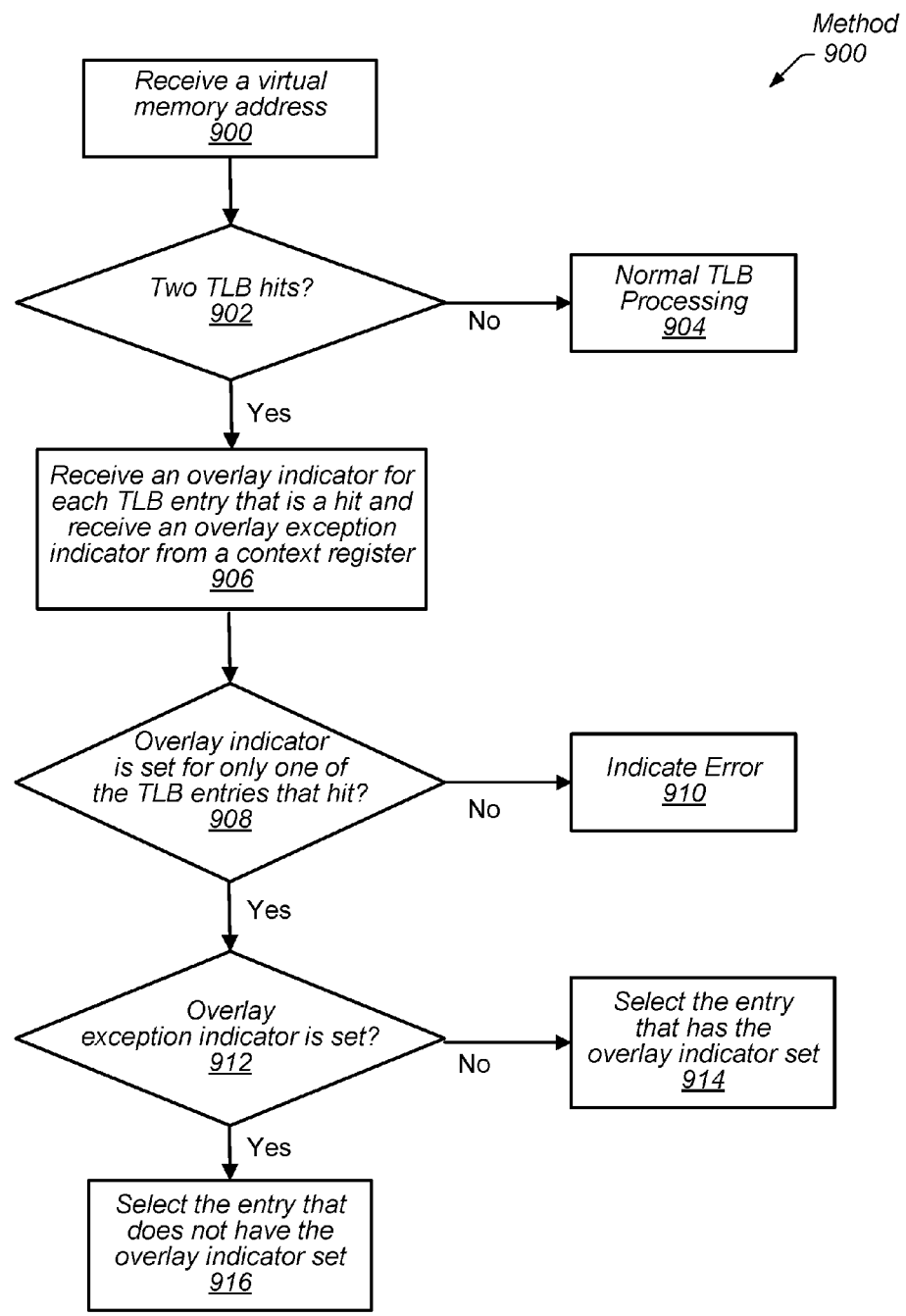
FIG. 9 is a flow diagram illustrating one embodiment of a method of operating a memory overlay system

FIG. 9 is a flow diagram illustrating one embodiment of a method 900 of operating a memory overlay system 100. At 902, the method includes receiving a virtual memory address for a memory operation. For example, the TLB 102 may receive the virtual address 114. At 902, the method determines if there is a TLB hit for two TLB entries. If there is only one hit, then the method proceeds to 904 for normal TLB processing. If there is a TLB hit for two TLB entries, then at 906, the method includes receiving, by the selection circuit 104, an overlay indicator for each TLB entry that is a hit, and an overlay exception indicator (e.g., from a context register). At 908, if an overlay indicator is not set for only one of the TLB entries that hit, then at 910, the method indicates an error. For example, the selection circuit 104 may provide an output that indicates an error.

At 908, if an overlay indicator is set for only one of the TLB entries that hit, then at 912, the selection circuit 104 determines if an overlay exception indicator is set. If the overlay exception indicator is not set, then at 914, the selection circuit 104 selects one of the two TLB entries that has the overlay indicator set. If the overlay exception indicator is set, then at 916, the selection circuit 104 selects one of the two TLB entries that does not have the overlay indicator set.

Figure 10:
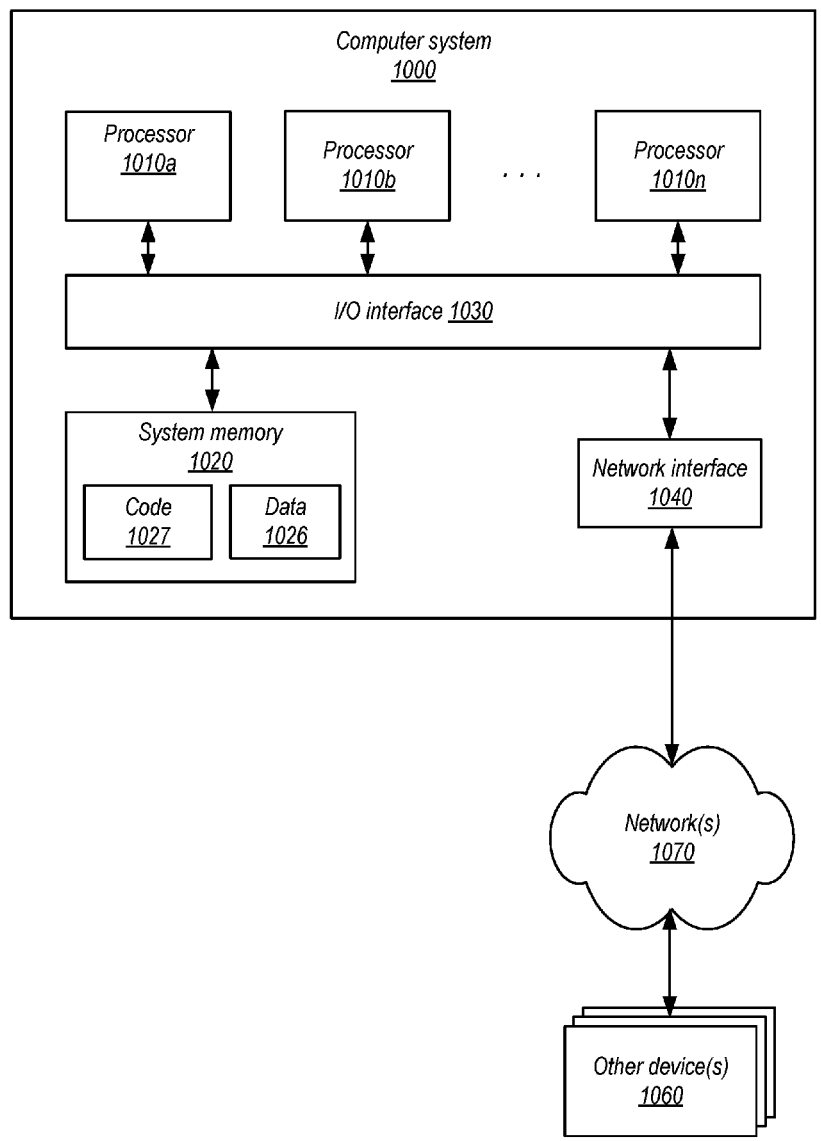
FIG. 10 is a block diagram illustrating an embodiment of an exemplary computing system that includes a memory overlay system.

One embodiment of a computer system configured to implement at least a portion of a memory overlay system such as memory overlay system 100 of FIG. 1 or the memory overlay system 200 of FIG. 2 is shown in FIG. 10. In the illustrated embodiment, the computer system 1000 includes one or more processors 1010a-n coupled to system memory 1020 via input/output (I/O) interface 1030. Computer system 1000 further includes network interface 1040 coupled to I/O interface 1030.

In various embodiments, computer system 1000 may be a uniprocessor system including one processor 1010a, or a multiprocessor system including several processors 1010a-n (e.g., two, four, eight, or another suitable number). Processors 1010a-n may be any suitable processors capable of executing instructions. For example, in various embodiments, processors 1010a-n may be general-purpose or embedded processors implementing any of a variety of instruction set architectures (ISAs), such as the x86, PowerPC, SPARC, or MIPS ISAs, or any other suitable ISA. In multiprocessor systems, each of processors 1010a-n may commonly, but not necessarily, implement the same ISA. One or more of processors 1010a-n may include at least a portion of a memory overlay system. For example, in the illustrated embodiment, processor 1010a includes the TLB 102 and the selection circuit 104 of FIG. 1 or the large page TLB 144, the overlay page TLB 146, and the selection circuit 104 of FIG. 2. However, in other embodiments, other processors may additionally include respective TLB's and selection circuits. Additionally, in some embodiments, one or more of processors 1010a-n may include one or more memory devices (e.g., memory 108).

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for memory corruption prevention, are shown stored within system memory 1020 as code 1027 and data 1026. In some embodiments, system memory 1020 includes or corresponds to memory 108 of FIG. 1. In other embodiments, memory 108 is located elsewhere in computer system 1000 (e.g., connected to I/O interface 1030 or a peripheral device connected to network interface 1040). System memory 1020 may be addressable by the TLB 102 (or the large page TLB 144 and the overlay page TLB 146) translating virtual addresses into physical addresses of system memory 1020.

In one embodiment, I/O interface 1030 is configured to coordinate I/O traffic between processors 1010a-n, system memory 1020, and any peripheral devices in the device, including network interface 1040 or other peripheral interfaces. In some embodiments, I/O interface 1030 performs protocols, timing or other data transformations to convert data signals from one component (e.g., system memory 1020) into a format suitable for use by another component (e.g., processor 1010a). I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into a processor 1010.

Network interface 1040 may be configured to allow data to be exchanged between computer system 1000 and other devices 1060 attached to a network or networks 1070. In various embodiments, network interface 1040 may support communication via any suitable wired or wireless general data networks, such as types of Ethernet network, for example. Additionally, the network interface 1040 may support communication via telecommunications/telephony networks such as analog voice networks or digital fiber communications networks, via storage area networks such as Fibre Channel SANs, or via any other suitable type of network and/or protocol.

In some embodiments, the system memory 1020 may be one embodiment of a computer-accessible medium configured to store program instructions and data as described above for FIGS. 1 through 7 for operating a memory overlay system. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

\* \* \*

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A processor, comprising:
   a translation lookaside buffer (TLB) storing a plurality of entries, wherein each of the plurality of entries comprises:
   physical address information associated with a respective virtual address range, and
   one or more memory attributes for a respective memory range,
   wherein an entry of the plurality of entries specifies a virtual address range that is a subset of a virtual address range specified by another entry of the plurality of entries, wherein the subset is fully encompassed within, and less than, the virtual address range for the other entry, wherein the TLB is configured to:
   receive a virtual memory address for a memory operation; and
   determine that the entry specifying the subset and the other entry are both TLB hits for the received virtual memory address; and a selection circuit configured to:
  in response to an indication from the TLB of two different entries as TLB hits for the same memory operation, select, based on one or more selection criteria, one of the two different entries; and
  cause the selected TLB entry including the corresponding physical address information and memory attributes to be provided to a memory interface for the processor.

2. The processor of claim 1, wherein:
the plurality of entries further comprise respective overlay indicators;
the one or more selection criteria comprise the respective overlay indicators for entries that are TLB hits; and
the selection circuit is further configured to:
  receive the respective overlay indicators for the different entries that are TLB hits; and
  select one of the two different entries based on respective states of the respective overlay indicators for the two different entries.

3. The processor of claim 1, further comprising:
a context register storing an overlay exception indicator for the memory operation; and
wherein:
  the plurality of entries further comprise respective overlay indicators;
  the one or more selection criteria comprise the overlay exception indicator and the respective overlay indicators for entries that are TLB hits; and
  the selection circuit is further configured to:
    receive the overlay exception indicator and the respective overlay indicators for the different entries that are TLB hits; and
    select one of the two different entries based on a state of the overlay exception indicator and on respective states of the respective overlay indicators for the two different entries.

4. The processor of claim 3, wherein the overlay indicator is set for only one of the two different entries that are TLB hits, wherein the selection circuit is further configured to:
  select the entry for which the overlay indicator is set when the overlay exception indicator is not set; and
  select the entry for which the overlay indicator is not set when the overlay exception indicator is set.

5. The processor of claim 1, further comprising:
a context register comprising an overlay indicator for the memory operation; and
wherein:
  the one or more selection criteria comprise the overlay indicator; and
  the selection circuit is further configured to:
    receive the overlay indicator; and
    select one of the two different entries based on a state of the overlay indicator.

6. The processor of claim 1, wherein the respective memory attributes of the two different entries each comprise different values.

7. The processor of claim 1, wherein the TLB is further configured to:
  create the entry in the TLB, even though the another entry, covers a relatively larger virtual address range including a relatively smaller virtual address range of the entry, already exists in the TLB.

8. The processor of claim 1, wherein the TLB is configured to output the corresponding physical address information and the respective memory attributes of the two different entries that are TLB hits to the selection circuit, and the selection circuit is configured to output the selected entry of the two different entries to the memory interface.

9. A computer system, comprising:
a memory; and
a processor, comprising:
  a translation lookaside buffer (TLB) storing a plurality of entries, wherein each of the plurality of entries comprises:
    physical address information corresponding to the memory and associated with a respective virtual address range, and
    one or more memory attributes for a respective memory range,
  wherein an entry of the plurality of entries specifies a virtual address range that is a subset of a virtual address range specified by another entry of the plurality of entries, wherein the subset is fully encompassed within, and less than, the virtual address range for the other entry, wherein the TLB is configured to:
    receive a virtual memory address for a memory operation; and
    determine that the entry specifying the subset and the other entry are both TLB hits for the received virtual memory address; and
  a selection circuit configured to:
    in response to an indication from the TLB of two different entries as TLB hits for the same memory operation, select, based on one or more selection criteria, one of the two different entries; and
    cause the selected TLB entry including the corresponding physical address information and memory attributes to be provided to a memory interface to the memory.

10. The computer system of claim 9, wherein:
the plurality of entries further comprise respective overlay indicators;
the one or more selection criteria comprise the respective overlay indicators for entries that are TLB hits; and
the selection circuit is further configured to:
  receive the respective overlay indicators for the different entries that are TLB hits; and
  select one of the two different entries based on respective states of the respective overlay indicators for the two different entries.

11. The computer system of claim 9, further comprising:
a context register storing an overlay exception indicator for the memory operation; and
wherein:
  the plurality of entries further comprise respective overlay indicators;
  the one or more selection criteria comprise the overlay exception indicator and the respective overlay indicators for entries that are TLB hits; and
the selection circuit is further configured to:
  receive the overlay exception indicator and the respective overlay indicators for the different entries that are TLB hits; and
  select one of the two different entries based on a state of the overlay exception indicator and on respective states of the respective overlay indicators for the two different entries.

12. The computer system of claim 11, wherein the overlay indicator is set for only one of the two different entries that are TLB hits, wherein the selection circuit is further configured to:

select the entry for which the overlay indicator is set when the overlay exception indicator is not set; and select the entry for which the overlay indicator is not set when the overlay exception indicator is set.

13. The computer system of claim 9, further comprising:
a context register comprising an overlay indicator for the memory operation; and wherein:
the one or more selection criteria comprise the overlay indicator; and
the selection circuit is further configured to:
receive the overlay indicator; and
select one of the two different entries based on a state of the overlay indicator.

14. The computer system of claim 9, wherein the respective memory attributes of the two different entries each correspond different levels of memory access permission.

15. A method, comprising:
storing, by a translation lookaside buffer (TLB) of a hardware processor, a plurality of entries, wherein each of the plurality of entries comprises:
physical address information associated with a respective virtual address range, and
one or more memory attributes for a respective memory range,
wherein an entry of the plurality of entries specifies a virtual address range that is a subset of a virtual address range specified by another entry of the plurality of entries, wherein the subset is fully encompassed within, and less than, the virtual address range for the other entry;
receiving, by the TLB, a virtual memory address for a memory operation;
in response to an indication from the TLB of two different entries as TLB hits for the same memory operation, selecting, by a selection circuit, based on one or more selection criteria, one of the two different entries; and
causing, by the selection circuit, the selected TLB entry including the corresponding physical address information and memory attributes to be provided to a memory interface for the processor.

16. The method of claim 15, wherein:
the plurality of entries further comprise respective overlay indicators;
the one or more selection criteria comprise the respective overlay indicators for entries that are TLB hits; and
selecting, based on one or more selection criteria, one of the two different entries, comprises:

receiving the respective overlay indicators for the different entries that are TLB hits; and
selecting one of the two different entries based on respective states of the respective overlay indicators for the two different entries.

17. The method of claim 15, further comprising:
storing, by a context register, an overlay exception indicator for the memory operation;
wherein:
the plurality of entries further comprise respective overlay indicators; and
the one or more selection criteria comprise the overlay exception indicator and the respective overlay indicators for entries that are TLB hits; and
selecting, based on one or more selection criteria, one of the two different entries, comprises:
receiving the overlay exception indicator and the respective overlay indicators for the different entries that are TLB hits; and
selecting one of the two different entries based on a state of the overlay exception indicator and on respective states of the respective overlay indicators for the two different entries.

18. The method of claim 17, wherein the overlay indicator is set for only one of the two different entries that are TLB hits, wherein selecting one of the two different entries further comprises:
selecting the entry for which the overlay indicator is set when the overlay exception indicator is not set; and
selecting the entry for which the overlay indicator is not set when the overlay exception indicator is set.

19. The method of claim 15, further comprising:
storing, by a context register, an overlay indicator for the memory operation; and
wherein:
the one or more selection criteria comprise the overlay indicator; and
selecting, based on one or more selection criteria, one of the two different entries, comprises:
receiving the overlay indicator; and
selecting one of the two different entries based on a state of the overlay indicator.

20. The method of claim 15, wherein the respective memory attributes of the two different entries each correspond to different levels of memory access permission.

* * * * *

UNITED STATES PATENT AND TRADEMARK OFFICE
CERTIFICATE OF CORRECTION

PATENT NO. : 10,061,712 B2
APPLICATION NO. : 15/151462
DATED : August 28, 2018
INVENTOR(S) : Rose et al.

Page 1 of 1

It is certified that error appears in the above-identified patent and that said Letters Patent is hereby corrected as shown below:

On the Title Page

Column 2, Line 4, item [56], delete "tp=8,arnumber" and insert -- tp=&arnumber --, therefor.

Column 2, Line 4, item [56], delete "2F/02Fieeexplore." and insert -- 2F%2Fieeexplore. --, therefor.

In the Specification

Column 1, Line 49, delete "a to" and insert -- a --, therefor.

Column 2, Line 39, delete "system" and insert -- system. --, therefor.

Column 5, Line 17, delete "security)" and insert -- security). --, therefor.

Column 11, Lines 43-47, delete "For example, if both TLB's hit for a particular virtual address 114, then the selection circuit 104 receives an indication that both TLB's hit and selects one of the overlay page entry 112 or the large page entry 110 based on the state of the overlay indicator 604." and insert the same on Column 11, Line 42, as a continuation of the same paragraph.

Signed and Sealed this
Ninth Day of July, 2019

Andrei Iancu
*Director of the United States Patent and Trademark Office*